TELEPHONE SYSTEM

Filed June 22, 1953 3 Sheets-Sheet 1

Inventor:
Adolf Bacher
By [signature]
Att'y

Sept. 2, 1958 A. BACHER 2,850,572

TELEPHONE SYSTEM

Filed June 22, 1953 3 Sheets-Sheet 2

Inventor:
Adolf Bacher
By [signature]
Att'y

Inventor:
Adolf Bacher
By
Att'y

United States Patent Office 2,850,572

Patented Sept. 2, 1958

2,850,572

TELEPHONE SYSTEM

Adolf Bacher, Berlin-Charlottenburg, Germany, assignor to Siemens & Halske Aktiengesellschaft, Munich and Berlin, Germany, a German corporation Application June 22, 1953, Serial No. 363,235

7 Claims. (Cl. 179—15)

This invention relates to signalling systems and is particularly concerned with a telephone system having circuit means for simultaneously transmitting a plurality of calls over a common transmission path by means of amplitude-modulated pulses. The common transmission path may extend over lines or may be wireless, employing a high frequency carrier. The pulses, serving as modulation carriers for the various calls or messages, are transmitted in staggered sequence. In known systems of this type, these staggered pulses are transmitted over the common transmission path, such as a trunk line, also during gaps in the transmission (for example a telephone conversation), during which gaps the pulses are of constant amplitude (unmodulated carrier amplitude). Therefore, interconnected subscribers while not talking, can listen in on conversations of interconnected subscribers talking over the same common transmission path, because of poor cross-talk damping, the latter being governed by the band width of the common path (pulse-end oscillation phenomena) and by the time lag between the pulses allotted to the various calls.

This is avoided in accordance with the present invention by providing, at the input end of the common path, means which are available for the individual calls to be transmitted; from among the various staggered modulation carrier pulses (channels) fed to them, these means act upon those pulses only which are specific to the communication in question; and as soon as modulation starts on these pulses, said means impart to these pulses such mean values of amplitude and/or polarity as to enable other means, available for this call at the output end of the common path, to evaluate the modulation.

The circuit arrangement according to the invention also permits an increase in the number of calls that can be simultaneously transmitted over the common path, that is, in the number of channels. As this is possible only by shortening the time interval between the staggered pulses, it would normally necessitate an increase in the band width of the transmission path (increase in wattage and decrease in impedance), but this cannot be carried too far as it would involve excessive expense. The invention presents a different possibility; a called subscriber, for example, may be connected so as to receive communications audibly only if his allotted modulated pulse is received with a critical or adequate amplitude and/or with a predetermined polarity. To determine whether this is the case, there may be provided at the output end of the common path, for example, a discharge tube (biased if necessary) whose conductivity or amplification ratio is intermittently varied by the simultaneous application of the pulse voltage and of the modulated pulses received over the common transmission path, so that the tube can control the completion of the connection to the receiving set proper. The use of such an electronic gate makes it possible to move the pulses of the various communication channels closer to each other and thus to increase the number of channels without thereby reducing the cross-talk damping for listening channels.

The invention will now be explained in greater detail with reference to the accompanying drawings, in which Fig. 1 shows an example of the network scheme;

Figs. 2 and 2*a* illustrate embodiments of the modulation device;

Figure 1:
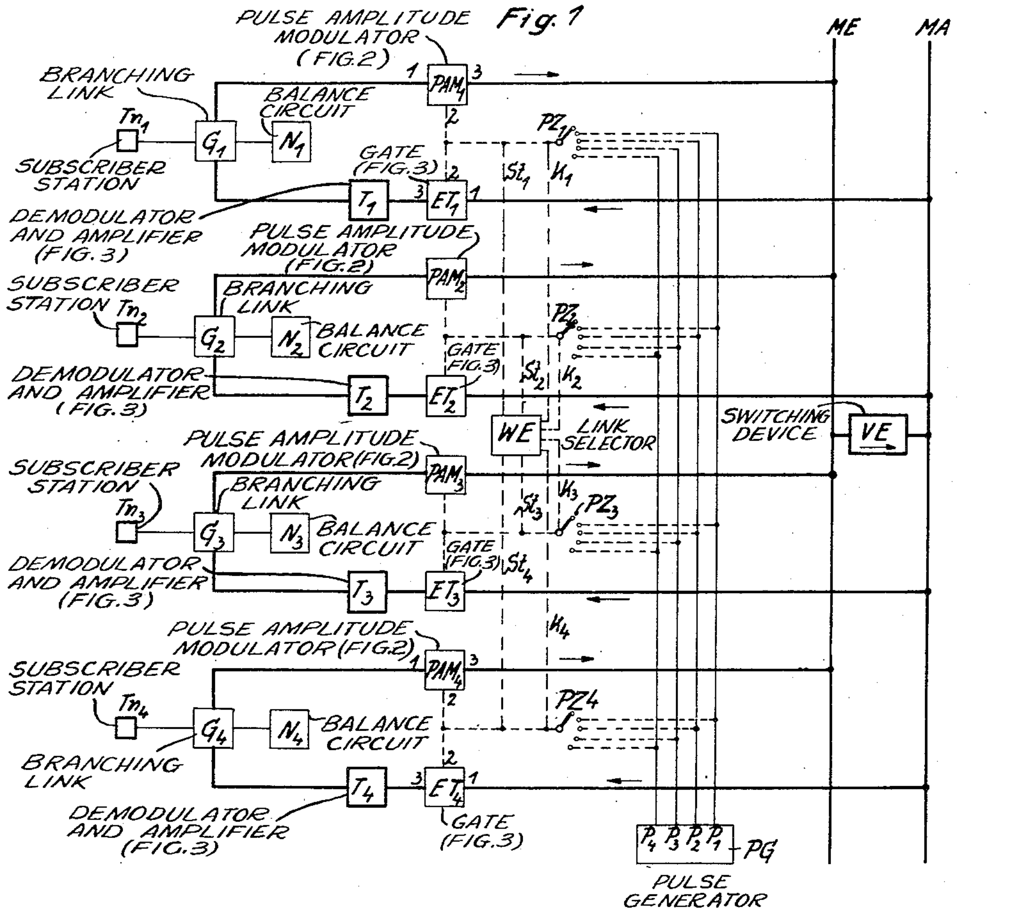

Referring now to Fig. 1, the subscribers T*n*1 to T*n*4 can communicate with each other over a common line having a multiplex inlet ME and a multiplex outlet MA. Any speaking subscriber is connected to multiplex inlet ME while a listening subscriber is connected to multiplex outlet MA. To permit two-way conversation, each subscriber is connected to a branched link, one side of which is connected to ME while the other side is connected to MA.

Assume, for example, that subscriber T*n*1 wants to make a call. Through a branching link G1, to which a balance circuit N1 is connected, he first reaches a pulse amplitude modulating device PAM1, the construction of which will be explained later. A pulse selector PZ1 allots to subscriber T*n*1 a definite pulse, for example P1, for the desired call; this pulse is supplied at a predetermined instant and periodically thereafter by a common pulse generator PG and is to be amplitude-modulated by the conversation; its mean value will then have a predetermined amplitude.

The pulse generator PG supplies, besides pulse P1, additional pulses such as P2, P3, P4 in timed sequence but with the same periodicity, which serve as carriers in the transmission of other calls to other subscribers. This staggering or time displacement of the pulses provides for the individual communication channels. After having been allotted a pulse, the calling subscriber T*n*1 determines the subscriber to be called, for example, T*n*4, this being done in known manner which has no bearing on the present invention, for example, by dialing to operate a link selector device WE through control link S*t*1 in such a way that this device WE makes pulse selector PZ4 available through selecting link K4. Pulse selector PZ4 allots pulse P1 to the called subscriber T*n*4. The above described preparatory connection between calling and called subscribers T*n*1 and T*n*4 could, of course, be accomplished in any other known and suitable manner. In accordance with the invention, the modulating device PAM1 causes the allotted pulse P1 to be transmitted through the common line at a predetermined rhythm and with an amplitude having a critical mean value provided the pulse is modulated by the voice of subscriber T*n*1. It will be understood that instead of controlling the magnitude of the amplitude, it is possible to control the polarity of the pulse, or else both of these characteristics, as a function of the modulation in such a manner that audible communication is possible only while modulation actually takes place. Reference as to the magnitude of the amplitude is therefore intended to include either or both control factors.

The modulated pulse is transmitted over the common line also to the electronic gate ET4 which passes the pulse on to subscriber T*n*4 only if the electronic gate ET4 has been opened in a manner presently to be described.

Conversations between subscribers T*n*2 and T*n*3 or between any other subscribers (not shown) are established over the common line or channel in a similar manner, employing pulses (such as P2, P3 or P4) which are displaced as to time relative to pulse P1 and which are modulated by the voice currents and then transmitted over the channel with the critical amplitudes. Again, these pulses reach the respective called subscribers only if their electronic gates are opened by the corresponding pulses having sufficient amplitude.

Figure 2:
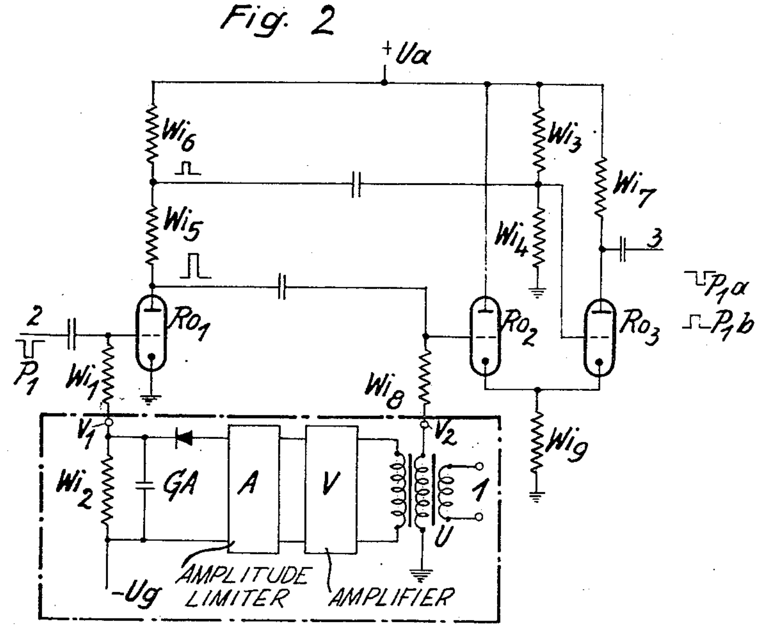
Figure 2A:
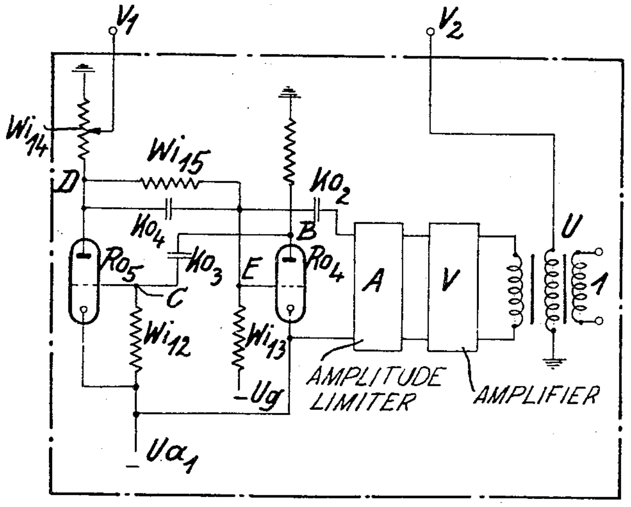
Figure 3:
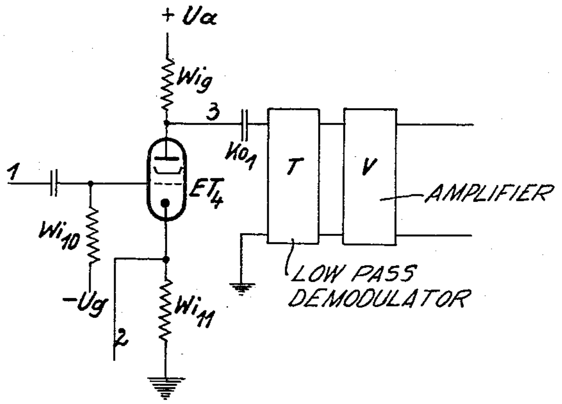
Fig. 3 is an embodiment of the electronic gate.

To explain this operation in greater detail, an embodiment of the modulating device PAM1 is illustrated in Fig. 2, while Fig. 3 shows an embodiment of an electronic gate such as ET4, both merely by way of example. In Fig. 2, the circuit portion surrounded by a dot-and-dash line, may be replaced by the circuit illustrated in Fig. 2*a*.

Referring first to Fig. 2, the tube R*o*1 in its normal condition has applied thereto, by way of resistors W*i*1 and W*i*2, a negative grid bias —U*g* of such value that tube R*o*1 is only partially open. Tube R*o*3 is open, because its grid has a positive bias applied thereto, taken off between resistors W*i*3 and W*i*4. Now when the calling subscriber T*n*1 is connected to the device PAM1 of Fig. 1, shown in detail in Fig. 2, and when the pulse selector PZ1 has allotted to the call the pulse P1 from among the time staggered pulses transmitted by the generator PG, arrival of this pulse (which is negative) by way of input link 2 will cause tube R*o*1 to be blocked, while cessation of the pulse will make the tube partially conductive again. Consequently, resistors W*i*5 and W*i*6 will receive positive pulses of low amplitude.

If resistors W*i*5 and W*i*6 are of such values that W*i*6 will receive a larger pulse than W*i*5, tube R*o*3 will shift farther into the range of positive grid potentials so that a negative pulse, such as P1*a*, will be applied to resistor W*i*7. This pulse may be used to effect engagement with and to condition for connection, in known manner, a known and suitable exchange or switchboard device VE (Fig. 1) associated with the common channel.

If the resistors W*i*5 and W*i*6 are of such values that W*i*5 receives a larger pulse than W*i*6, this will modify the grid potential of tube R*o*2 so that the latter is opened; a positive potential is thereby applied to cathode resistor W*ig*, and this makes the grid of tube R*o*3 relatively negative so that a positive pulse P1*b* is applied to resistor W*i*7. This pulse may likewise be used in known manner for any desired signalling or controlling operations.

As already mentioned, dialing by the calling subscriber T*n*1 operates the link selector device WE over the control line S*t*1 in such a manner that pulse selector PZ4 is conditioned over the selecting line K4 to determine the desired subscriber T*n*4. Selector PZ4 connects itself, in a manner not shown, to the output side of generator PG which supplies pulse P1. Consequently, electronic gate ET4 also receives pulse P1 which has been alotted to the calling subscriber T*n*1. The switching operations initiated thereby will be described presently. On the calling subscriber's side, the voice currents, supplied to the device PAM1 (Fig. 2) by way of inlet 1, are passed through repeater U, amplifier V, amplitude limiting device A and a rectifier device GA to furnish a D. C. potential which is applied to the grid of tube R*o*1. This D. C. potential causes the tube to become fully conductive so that higher voltage amplitudes are applied to resistors W*i*5 and W*i*6 than was the case in the above illustrated instance of a mere signal transmission. The modulated voltage is further supplied to the grid of tube R*o*2 by way of resistor W*i*8, this grid also receiving the potential taken off from resistor W*i*5. Thus, the current passing through tube R*o*2 is proportional to the voice current amplitude occurring at resistor W*i*5 while the pulse P1 lasts. This renders the cathode of tube R*o*3 more positive than the grid, or in other words, the grid becomes more negative than it was before. Accordingly, a positive pulse with modulation occurs at resistor W*i*7; and this pulse is transmitted by way of the multiplex inlet ME (Fig. 1) of the common channel to switching device VE and then by way of the multiplex outlet MA to the electronic gate ET4 of the called subscriber T*n*4. The potential taken off between resistors W*i*3 and W*i*4 and applied to the grid of tube R*o*3, together with the positive pulse taken off between resistors W*i*5 and W*i*6, determines the magnitude (mean value) of the modulation carrier pulse P1, that is, it fixes its critical amplitude about which the modulation is symmetrically distributed. The pulses P1, modulated by the conversation, are transmitted by way of multiplex inlet ME, switching device VE and multiplex outlet MA to the grid of the electronic gate ET4 (Fig. 1) which is illustrated more in detail in Fig. 3.

The electronic gate ET4 (Fig. 3) is biased with a negative grid potential —U*g* of such value that further, simultaneous, pulses must be applied to the grid to raise the tube to the working point of its operative range. The electronic gate ET4 is to be opened in synchronism with the pulses P1; this opening is prepared, by the application of the negative pulse P1 to the cathode by way of input link 2, to such an extent that the mean value (critical amplitude) of pulse P1, being simultaneously fed in by way of link 1, is capable of raising the electronic gate ET4 to its working point, whereby the component of the pulse P1 due to modulation can control the electronic gate ET4 in the operating range of the latter.

Figure 4:
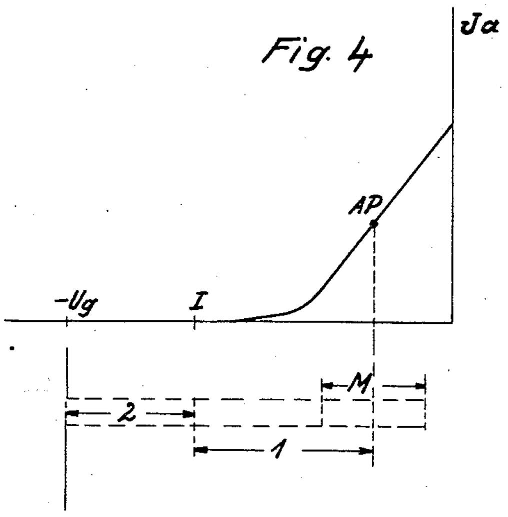
Fig. 4 shows a diagram to explain the operation.

The operation just described will be better understood upon consideration of Fig. 4. Application of pulse P1 by way of input link 2 shifts the grid bias from its original value —U*g* to point I, and the simultaneous application of the pulse by way of link 1, assuming its amplitude has the critical value, causes the tube to reach the working point AP, on both sides of which the tube current is controlled by the applied modulation M. It will thus be seen that the pulse P1 with its component due to modulation, will be passed by the electronic gate ET4 only if the negative pulse P1 is applied by way of link 2 with simultaneous application of the critical amplitude of this pulse by way of link 1. The anode resistor W*i*9 will then receive pulsating voltages proportional to this modulation component of the pulse, and these voltages are transmitted by way of capacitor K*o*1 to a low-pass demodulator T. The low frequency, freed of the high frequency component, is amplified to the desired output level in an amplifier V and is then conducted to the called station T*n*4. The demodulator T and amplifier V have been indicated in Fig. 1 as a combined unit T4.

In calling the subscriber T*n*4, it is possible, for example, to modulate the pulses with a call frequency to the extent of 100% whereby especially high signal voltages obtain at the outlet of electronic gate ET4.

As has been explained above, a negative pulse P1*a* (Fig. 2) may arise under certain circumstances, depending on the selected magnitudes of resistors W*i*5 and W*i*6. Such a negative pulse may be used to bias the grid of electronic gate ET4 (Fig. 3) still further to the negative side whereby, in accordance with the tube characteristic of Fig. 4, the anode tail current is still further reduced and the cross-talk damping is thus enhanced.

The speech of subscriber T*n*1 is transmitted to subscriber T*n*4, as it were through a definite channel, by the rhythmic transmission of pulse P1. The speech of the called subscriber T*n*4 can be similarly transmitted to subscriber T*n*1 by the use of the pulse-amplitude modulator PAM4 and electronic gate ET1. Pulse P1 again constitutes the allotted transmission channel.

Other subscribers engaged in calls have other pulses allotted to them, which are as to time displaced from each other and from pulse P1 and which are similarly effective to actuate corresponding pulse amplitude modulating devices and electronic gates.

Fig. 2*a* illustrates a modification of the circuit portion included within the dot-dash rectangle of Fig. 2. In this embodiment, no D. C. voltage is derived from the voice currents fed in at 1, that is, from the modulation voltage, and no such voltage is supplied to the grid of the tube R*o*1 (Fig. 2); instead, a special tube circuit including tubes R*o*4 and R*o*5 is provided which supplies the grid of tube R*o*1 with the modulation peaks practically free of lag or inertia. The grid biases are such that in the normal condition, tube R*o*5 passes current as its grid has bias O applied by way of resistor *Wi*12. This, in conjunction with the negative bias —*Ug* provides, at point E, a negative potential for the grid of tube R*o*4 so that the latter is non-conductive. As soon as voice currents for modulation are received at 1, due to a subscriber's talking, they are transmitted through amplifier V, amplitude-limiting device A and a differentiating element comprising capacitor K*o*2 and resistor *Wi*13, whereby the positive peaks of the modulation are made effective on the grid of tube R*o*4 and render this tube conductive. This causes lowering of the plate potential at point B, whereby a negative pulse is applied by way of capacitor K*o*3 to point C which acts on the grid of tube R*o*5 and makes the latter non-conductive. Point D thus has a positive plate potential (O). The potential taken off from an intermediate point of resistor *Wi*14 applies, by way of resistor *Wi*1 (Fig. 2), such a grid potential to tube R*o*1 that the latter becomes conductive. In addition, the feedback circuit from tube R*o*5 to tube R*o*4, comprising resistor *Wi*15 and capacitor K*o*4 in parallel, applies to point E (the grid of tube R*o*4) a potential, even after disappearance of the positive modulation peak, of such magnitude that tube R*o*4 continues to remain conductive. This condition remains for a period of time governed by the time constant of capacitor K*o*3 and resistor *Wi*12, namely until capacitor K*o*3 has been discharged through resistor *Wi*12, that is, until point C (the grid of tube R*o*5) becomes more positive so that the tube R*o*5 becomes conductive. This produces a negative plate potential at D, which acts by way of resistor *Wi*15 and capacitor K*o*4 upon the grid of tube R*o*4 and makes the latter non-conductive. The above mentioned feedback results in rapid change-over of tube R*o*5 from blocked to open, and of tube R*o*4 from open to blocked condition.

The next succeeding positive modulation peak causes the same operation as just described, so that tube R*o*1 (Fig. 2) becomes conductive as soon as modulation takes place; as described with reference to Fig. 2, this causes the transmission of modulated pulses P1 by way of the common channel or trunk and through the electronic gate ET4 of the called subscriber, this gate opening in timing with the arriving pulses.

It will be apparent from the foregoing that the pulses such as P1, serving as modulation carriers and as channels, initiate an effective connection through the common trunk or channel only when modulation takes place; and that these pulses will reach the called subscriber (to complete the connection) only if his electronic gate is opened in timing with these pulses. During gaps in the conversation over a switched-through line, the channel-forming but unmodulated pulse passes through the line with insufficient amplitude. Consequently, even pulse-end oscillation phenomena in other connections during this period cannot result in cross-talk because the pertinent electronic gates are not open during gaps in the conversation.

If the control of the electronic gates is to be made dependent on the polarity of the pulses, the grid bias —*Ug* must be so selected that the working point AP of the tube characteristic is reached only with the pulse polarity resulting from the occurrence of modulation.

Changes may be made within the scope and spirit of the appended claims.

I claim:

1. In a telephone system having subscriber's stations and having means forming a common channel for the simultaneous transmission by voice current modulated pulses of a plurality of calls extending between calling and called stations and having a generator for producing pulse series with the pulses of each series displaced as to time with respect to pulses of other of said series and having means for allotting a definite one of said pulse series to a call to be extended from a calling to a called station; apparatus for reducing the incidence of crosstalk, said apparatus comprising a first control device connected with the input side of said common channel for receiving the definite series of pulses allotted to a call to be extended, the pulses of said allotted series to serve as voice current modulated carriers for the corresponding call, circuit means in said first control device responsive to voice currents received from the respective calling station for raising the mean value of pulses of the allotted pulse series as to amplitude thereof, a second control device connected with the output side of said common channel for receiving pulses therefrom and for passing in the direction of the corresponding called station only the pulses of said allotted series the mean amplitude value of which had been raised by modulation with said voice currents, and means for demodulating said passed pulses and transmitting the resulting voice currents to the called station.

2. In a telephone system having subscriber's stations and having means forming a common channel for the simultaneous transmision by voice current modulated pulses of a plurality of calls extending between calling and called stations and having a generator for producing pulse series with the pulses of each series displaced as to time with respect to pulses of other of said series and having mean for allotting a definite one of said pulse series to a call to be extended from a calling to a called station; apparatus for reducing the incidence of crosstalk, said apparatus comprising a first control device connected with the input side of said common channel for receiving the definite series of pulses allotted to a call to be extended, the pulses of said allotted series to serve as voice current modulated carriers for the corresponding call, circuit means in said first control device responsive to voice currents received from the respective calling station for raising the means value of pulses of the allotted pulse series as to amplitude thereof and for transmitting such voice current amplitude-modulated pulses to the input side of said common channel together with unmodulated pulses, a second control device connected with the output side of said common channel for receiving pulses therefrom and for passing in the direction of the corresponding called station only said voice current amplitude-modulated pulses, and means for demodulating said passed voice current amplitude-modulated pulses and transmitting the resulting voice currents to the called station.

3. A system and cooperation of parts according to claim 2, wherein said first control device comprises electron tubes, means for deriving a first voltage from said carrier pulses, means for deriving a second voltage from said voice currents, means for combining said first and second voltages, and means for controlling said tubes by the potential of said combined voltages to effect transmission of said modulated pulses to the input side of said common channel.

4. A system and cooperation of parts according to claim 2, wherein said first control device comprises electron tubes, means for deriving a first voltage from said carrier pulses, means for deriving a second voltage from said voice currents and for rectifying said second voltage, means for combining said first voltage with said second rectified voltage, and means for controlling said tubes by the potential of said combined voltages to effect transmission of said modulated pulses to the input side of said common channel.

5. A system and cooperation of parts according to claim 2, wherein said first control device comprises a pair of serially connected electron tubes, means for deriving a first voltage from said carrier pulses, means for causing said voice currents to control said tubes so as to produce in the output of one of said tubes a second voltage, means for combining said first and second voltages, and further electron tube means controlled by said combined voltages to effect transmission of said modulated pulses to the input side of said common channel.

6. A system and cooperation of parts according to claim 2, wherein said first control device comprises a pair of serially connected electron tubes, means for deriving a first voltage from said carrier pulses, means for causing said voice currents to control said tubes so as to produce in the output of one of said tubes a second voltage, feedback circuit means extending between said serially connected tubes, said feedback means comprising a capacitor and a resistor in parallel therewith, the frequency response of said feedback means compensating the frequency response of a circuit component which comprises the grid-cathode-capacitance of one of said tubes and a grid resistor connected in parallel therewith.

7. A system and cooperation of parts according to claim 2, wherein said second control device comprises electron discharge tube means for evaluating the pulses received from the output side of said common channel and for passing in the direction of the called station only said amplitude-modulated pulses.

References Cited in the file of this patent

UNITED STATES PATENTS

| | | |
|---|---|---|
| 2,543,736 | Trevor | Feb. 27, 1951 |
| 2,548,796 | Houghton | Apr. 10, 1951 |